Figure 1:
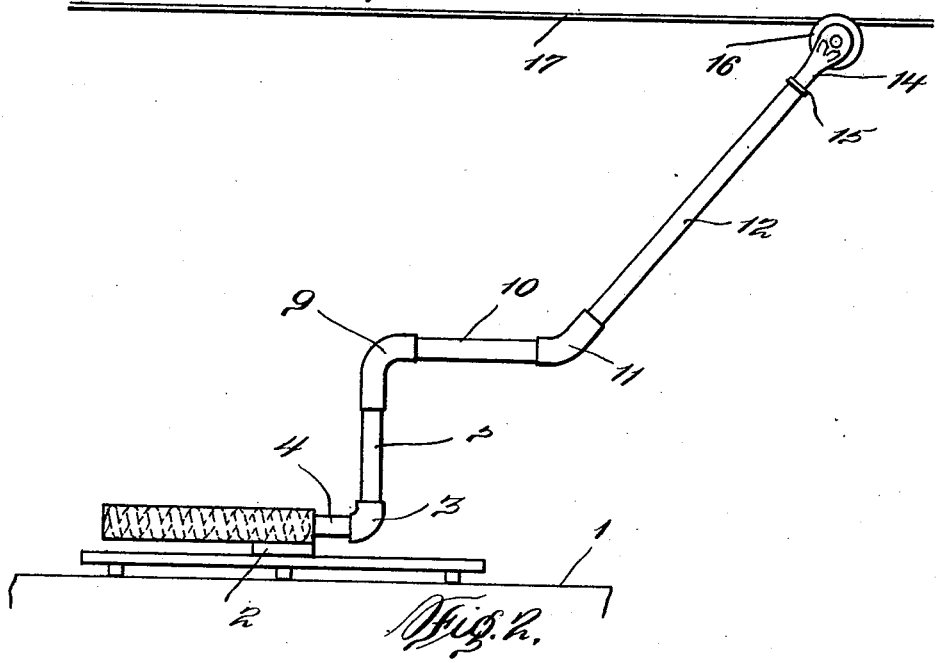

R. BLACK.
TROLLEY.
APPLICATION FILED JULY 26, 1910.

999,624.

Patented Aug. 1, 1911.

WITNESSES

INVENTOR
Richard Black

By
Attorneys

UNITED STATES PATENT OFFICE.

RICHARD BLACK, OF CANONSBURG, PENNSYLVANIA.

TROLLEY.

999,624.

Specification of Letters Patent.   Patented Aug. 1, 1911.

Application filed July 26, 1910.   Serial No. 573,985.

*To all whom it may concern:*

Be it known that I, RICHARD BLACK, a citizen of the United States of America, residing at Canonsburg, in the county of Washington and State of Pennsylvania, have invented certain new and useful Improvements in Trolleys, of which the following is a specification, reference being had therein to the accompanying drawing.

This invention relates to trolleys, and the objects of my invention are to provide positive and reliable means in connection with a trolley for normally retaining the same upon a trolley wire or electric conductor, and to provide a trolley for accomplishing the above object that will not interfere with the hangers or other overhead equipment of electrically operated railways.

Other objects of my invention are to eliminate the displacement of trolleys when cars are traveling with considerable rapidity, rounding curves or encountering grades and irregularities in the trolley wire or conductor, and to accomplish the above results by a structure that is simple, durable, inexpensive to manufacture, applicable to various types of electrically driven vehicles and efficient for the purposes for which it is employed.

These and such other objects as may hereinafter appear are attained by the novel construction, combination and arrangement of parts to be hereinafter specifically described and then claimed.

Reference will now be had to the drawing forming a part of this specification, wherein there is illustrated a preferred embodiment of the invention, but it is to be understood that the structural elements thereof are susceptible to such changes as fall within the scope of the appended claim.

Figure 2:
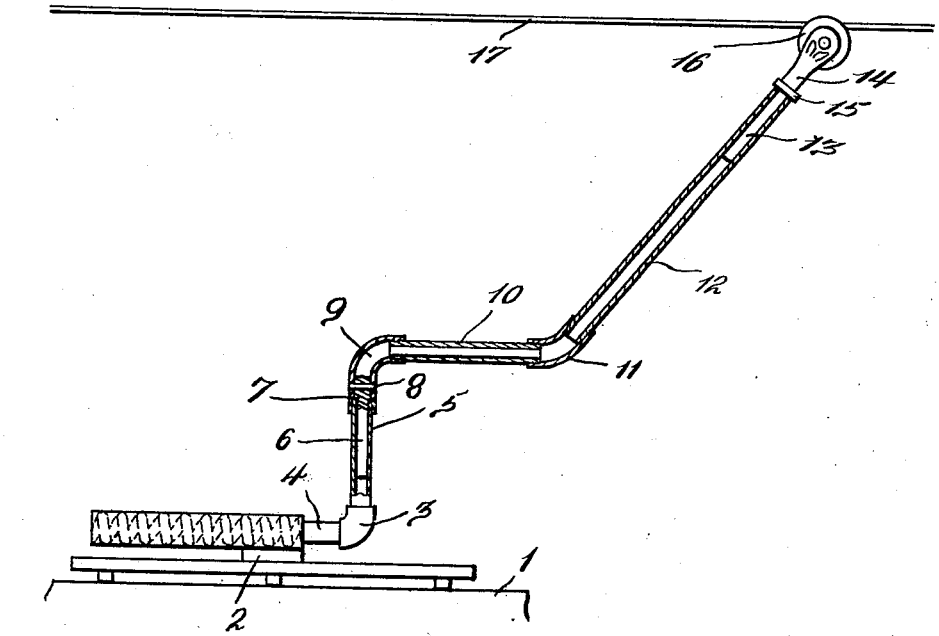

In the drawing:—Figure 1 is a side elevation of the trolley, and Fig. 2 is a vertical sectional view of the same.

In the accompanying drawing the reference numeral 1 denotes the top of a car or electrically driven vehicle, and 2 indicates any conventional form of trolley base capable of maintaining the pole in an upright position and bears against the trolley wire. Attached to the socket 4 of the trolley base in an elbow 3 and connected to said elbow is a vertical tube or pipe 5 and swiveled or rotatably mounted in the upper end of said tube is the cylindrical shank 6 of a head 7, said head resting upon the upper edges of the tube 5. Riveted or otherwise connected to the head 7, as at 8 is an elbow 9 and connected to said elbow is a horizontal pipe 10. The end of this pipe is provided with an elbow 11, the reverse of the elbow 9, and screwed or otherwise mounted in the elbow 11 is an angularly disposed tubular pole 12. Swiveled or rotatably mounted in the upper end of the pole 12 is the cylindrical shank 13 of a trolley harp 14, said harp having a collar or annular flange 15 resting upon the upper edges of the pole 12. Journaled in the harp 14 is a trolley wheel 16 adapted to travel upon a trolley wire or electric conductor 17.

From the foregoing it will be observed that the trolley harp 14 can rotate relatively to the pole 12, that the pole 12 can rotate relatively to the tube 5, these two movements allowing the trolley harp to swing in a lateral plane with respect to the wire 17, while the trolley base allows the harp 14 to move in a vertical plane to compensate for the ordinary differences in the distance between the trolley wire and the track upon which the trolley car travels.

Since the trolley can swing in a lateral plane, the wheel 16 of the harp can readily adjust itself to the trolley wire 17 when said wire is out of alinement with the center of the track beneath said wire. It is therefore evident that when rounding a curve, the trolley wire will normally remain upon the wire and accidental displacement of the trolley wire is practically impossible.

What I claim is:—

The combination with a trolley base having a socket, a vertical tube mounted in said socket, a head rotatably mounted upon the upper end of said tube, a depending shank carried by said head and extending into said tube, an elbow fixed to said head, a pipe connected to said elbow, an elbow connected to the end of said pipe, an angularly disposed pole connected to the last mentioned elbow, a trolley harp, and a shank carried by said harp and extending into the upper end of said pole for rotatably supporting said harp, substantially as described.

In testimony whereof I affix my signature in the presence of two witnesses.

RICHARD BLACK.

Witnesses:
 JNO. C. MORGAN,
 T. M. REESE.